United States Patent [19]
Sekizawa et al.

[11] Patent Number: 4,745,467
[45] Date of Patent: May 17, 1988

[54] COLOR IMAGE-PROCESSING APPARATUS

[75] Inventors: Hidekazu Sekizawa, Yokohama; Naofumi Yamamoto, Tokyo; Tutomu Saito, Yokohama; Haruko Kawakami, Funabashi, all of Japan

[73] Assignee: Kabushiki Kaisha Toshiba, Kawasaki, Japan

[21] Appl. No.: 923,045

[22] Filed: Oct. 24, 1986

[30] Foreign Application Priority Data

Oct. 28, 1985 [JP] Japan .................................. 60-240974
Oct. 17, 1986 [JP] Japan .................................. 61-246988

[51] Int. Cl.$^4$ .............................................. H04N 1/46
[52] U.S. Cl. ........................................ 358/80; 358/75; 358/78
[58] Field of Search ............................... 358/80, 75, 78

[56] References Cited

U.S. PATENT DOCUMENTS 4,058,828 11/1977 Ladd ..................................... 358/78
4,418,358 11/1983 Poetsch et al. ...................... 358/80
4,649,423 3/1987 Hoffrichter ........................... 358/80
4,661,843 4/1987 Sekizawa .............................. 358/80

FOREIGN PATENT DOCUMENTS 2623741 10/1978 Fed. Rep. of Germany .
59-67781 4/1984 Japan .
60-35661 8/1985 Japan .

Primary Examiner—Howard W. Britton
Attorney, Agent, or Firm—Oblon, Fisher, Spivak, McClelland & Maier

[57] ABSTRACT

A color copier comprises a color line-image sensor, a matrix circuit, and a color conversion circuit. The color line-image sensor reads a color document, to output a plurality of fundamental color signals. The matrix circuit converts the fundamental color signals into a brightness signal and two color-difference signals. The color-conversion circuit converts the brightness and color difference signals into ink-amount control signals for controlling the amounts of color inks used in a color printer. In order to decrease the memory capacity of the color conversion circuit and faithfully reproduce dark colors, a nonlinear conversion circuit is provided at the preceding stage of the matrix circuit. The nonlinear conversion circuit is arranged to increase a change in level of an input signal in a low-level range, to an extent greater than that in a high-level range.

10 Claims, 6 Drawing Sheets

FIG. 8A
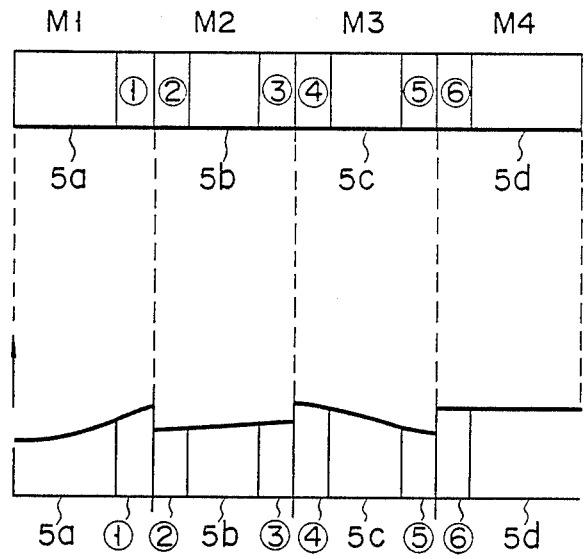
FIG. 8B
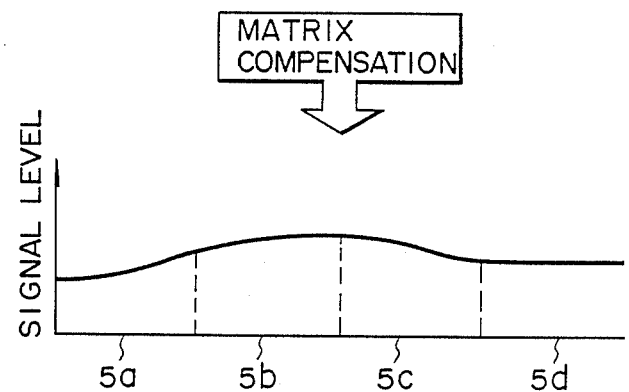
FIG. 8C

F I G. 10
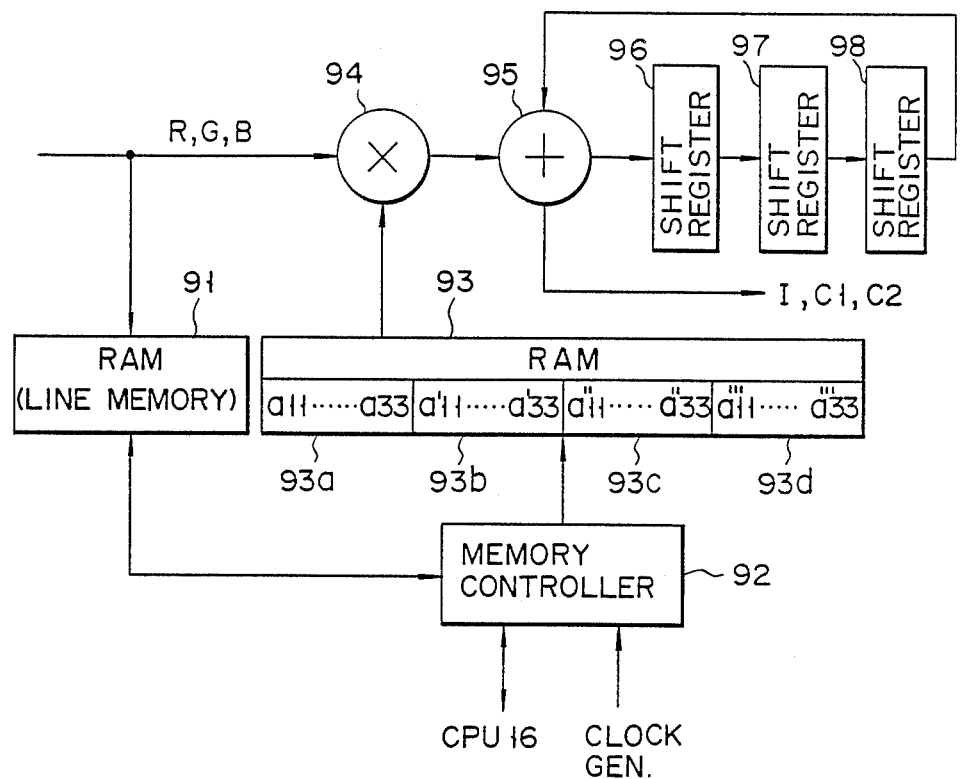

COLOR IMAGE-PROCESSING APPARATUS

BACKGROUND OF THE INVENTION

The present invention relates to a color image processing apparatus and, more particularly, to a color image-processing apparatus for use in a color copier.

Japanese laid-open Patent Publication No. 60-38796 discloses a color copier comprising: a color line-image sensor for optically reading a color image of an original document to be copied, and generating color image signals; a matrix circuit for converting color image signals into brightness and color-difference signals; and a color conversion circuit for converting the brightness and color-difference signals into ink-amount control signals, to control the amounts of color inks (e.g., yellow, red, magenta, and cyan) used in a color printer. The color conversion circuit is comprised of a data table formed of a read-only memory (ROM).

With the apparatus as described above, in order to faithfully reproduce dark colors which are visually very important, the color conversion circuit (ROM table) must have a considerably large memory capacity. Conversely, to reproduce light colors, the contents of the ROM table are quantized much more finely than required. This means that substantially the same information is uselessly stored in the ROM table.

With the prior art, it is possible to change hues by changing matrix conversion coefficients stored in the matrix circuit. To greatly change a hue, however, if the matrix conversion coefficients are simply changed, then the change in hue would become different for each color, and the saturation of the color would also be degraded. As a result, a color image would be reproduced whose hues would look unnatural.

The color image sensor is comprised of a CCD (charge-coupled device). In practice, the image sensor comprises a plurality of CCD chips to cover the size (width) of the document for copying. The CCD chips are arranged along the widthwise direction (the main scanning direction) of the document. With such a configuration, however, variations in characteristics among chips (especially variations in spectral characteristics of color filter arrays provided for the CCD chips) are inevitable, thus resulting in variations in the output signals of the CCD chips. As a result, noticeable differences between reproduced colors would appear at those portions of a reproduced image corresponding to boundaries between the CCD chips.

A copending U.S. patent application Ser. No. 753,260 filed Sept. 9, 1985, now U.S. Pat. No. 4,661,843 and assigned to the same assignee as this application discloses a color image copying apparatus which comprises a nonlinear conversion circuit between a matrix circuit and a color conversion circuit for the purpose of changing, for example, the density of a reproduced color image.

SUMMARY OF THE INVENTION

It is an object of the present invention to provide an improved color image-processing apparatus.

It is another object of the present invention to provide a color image-processing apparatus which can faithfully reproduce dark colors, which are visually important, with a reduced memory capacity of a color conversion circuit.

It is still another object of the present invention to provide a color image-processing apparatus which can compensate for variations in reproduced colors, caused by variations in the optical characteristics of CCD chips of a color line-image sensor.

According to the present invention, there is provided a color copier comprising a color line-image sensor for reading a color document, to output a plurality of fundamental color signals, a matrix circuit for converting the fundamental color signals into a brightness signals and two color-difference signals, and a color conversion circuit for converting the brightness signal and the color-difference signals into ink-amount control signals for controlling the amounts of color inks used in a color printer. To achieve the above objects, a nonlinear conversion circuit is provided at the preceding stage of the matrix circuit, in order to increase a change in level of an input signal in a low-level range, to an extent greater than that in a high-level range.

The nonlinear conversion circuit preferably has the conversion characteristic given by $$Xo = \{(Xi+D)^n - D^n\} / \{(1+D)^n - D^n\}$$

where $Xi$ is an input signal and $Xo$ is an output signal of the nonlinear conversion circuit, and $D$ and $n$ are each a constant. $D$ is about 0.05, and $n$ is ranged from $\frac{1}{2}$ to $\frac{1}{3}$.

According to another feature of the present invention, when a color line-image sensor is divided into a plurality of sensor sections along the line direction of the document, matrix conversion coefficient sets corresponding to the respective sensor sections, which decrease a difference in color of a reproduced image, are provided in a matrix circuit, in order to decrease differences in color at portions of the reproduced image corresponding to the boundaries of the sensor sections, which color difference is caused by differences in the characteristics of the sensor sections.

BRIEF DESCRIPTION OF THE DRAWINGS

FIGS. 8A, 8B, and 8C are diagrams for explaining a method for compensating the matrix conversion coefficients used in a matrix circuit;

FIG. 10 shows an arrangement of the matrix circuit.

DETAILED DESCRIPTION OF THE PREFERRED EMBODIMENTS

Figure 1:
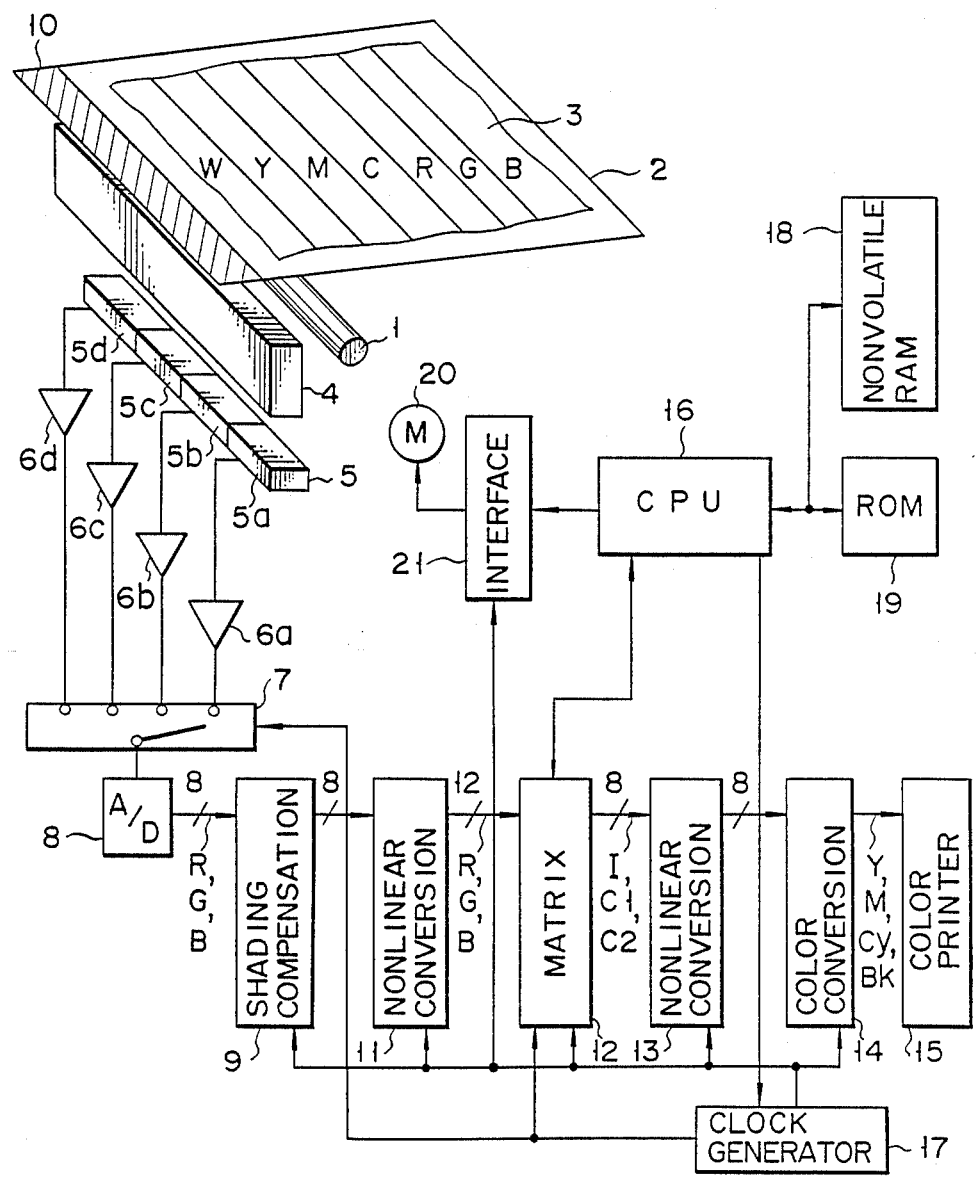
FIG. 1 shows a configuration of a color copying system according to an embodiment of the present invention.
Figure 2:
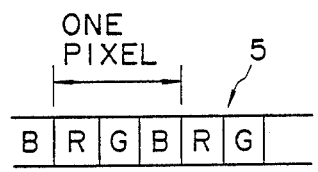
FIG. 2 shows a configuration of one pixel of a color filter array of a color line-image sensor used in FIG. 1.

Referring to FIG. 1, a linear light source 1 illuminates an original document 3 placed on transparent glass plate 2. One line of document 3 is focused on color line-image sensor 5 comprised of four CCD chips 5a to 5d in this embodiment, through self-focusing rod lens array 4. In image sensor 5, R (red), G (green), and B (blue) filter elements are disposed on three adjacent light-detecting elements formed in a line and constituting one pixel, as is shown in FIG. 2. R, G, and B electrical signals are sequentially read out from each of CCD chips 5a to 5d.

The color image signals read out from chips 5a to 5d are sequentially applied to analog switch 7 via amplifiers 6a to 6d, respectively. Switch 7 sequentially supplies the electrical signals read out from chips 5a to 5d to analog-to-digital (A/D) converter 8, to convert each of the R, G, B electrical signals into an 8-bit digital signal. A/D converter 8 provides R, G, and B electrical signals representing one line of the document in the widthwise direction (the main scanning direction) of document 3. An output signal of A/D converter 8 is applied to shading compensation circuit 9. Shading compensation circuit 9 is provided for compensating for a variation in intensity of light rays emitted by light source 1 onto document 3, and for compensating for a variation in the light-detecting sensitivity of light-detecting elements of image sensor 5. Compensation circuit 9 normalizes image signals, such that a signal level representing white is normalized to 1 and a signal level representing black to 0.

A white-colored reference plate 10 is placed on glass plate 2. Compensation circuit 9 normalizes an image signal I as follows:

$$Io = (I - Ib)/(Iw - Ib) \tag{1}$$

where Iw is the level of an output signal of A/D converter 8 which represents white reference plate 10, and Ib is the level of an output signal of converter 8 when light source 1 is turned off.

Compensation circuit 9 comprises a 1-line memory for white reference signal level and a 1-line memory for black reference signal level, and normalizes an electrical signal from each light detection element of image sensor 5, in accordance with equation (1).

An output signal of compensation circuit 9 is applied to first nonlinear conversion circuit 11 provided in accordance with the present invention. Conversion circuit 11 may be comprised of a ROM or RAM (random-access memory). The conversion characteristic of conversion circuit 11 is given by:

$$Xo = \{(Xi + D)^n - D^n\}/\{(1 + D)^n D^n\} \tag{2}$$

where Xi is an input signal, Xo is an output signal, D is a constant of about 0.05, and n is a constant of preferably $\frac{1}{2}$ to $\frac{1}{3}$.

Figure 3:
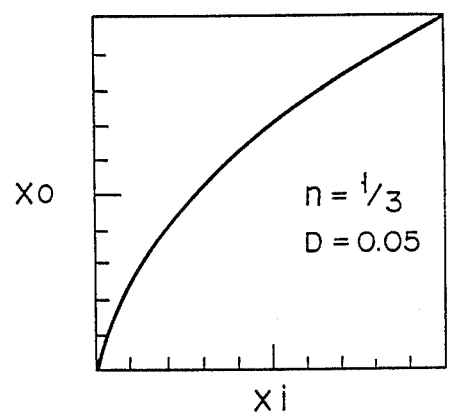
FIG. 3 shows an example of the input/output characteristic of a nonlinear conversion circuit shown in FIG. 1.

FIG. 3 shows the input/output characteristics of conversion circuit 11 when D=0.05 and n=$\frac{1}{3}$. It will be understood from FIG. 3 that a change in level of input signal Xi in a low-level range provides a larger change in level of the output signal Xo than that of a high-level range. Therefore, a small change in a signal representing a dark color component (low-brightness component), which is visually important, is converted to a large change in level of the output signal, thereby contributing to faithful reproduction of colors. Nonlinear conversion circuit 11 converts an 8-bit input signal to a 12-bit output signal.

The output signal of conversion circuit 11 is applied to matrix circuit 12, and R, G, and B signals of each pixel are converted into brightness signal I and color difference signals C1 and C2. The conversion equation of matrix circuit 12 is given by $$\begin{pmatrix} I \\ C1 \\ C2 \end{pmatrix} = \begin{pmatrix} a11 & a12 & a13 \\ a21 & a22 & a23 \\ a31 & a32 & a33 \end{pmatrix} \begin{pmatrix} R \\ G \\ B \end{pmatrix} \tag{3}$$

The conditions for forming a conversion table of matrix circuit 12 are:

$$a11 + a12 + a13 = 1$$
$$a21 + a22 + a23 = 0 \tag{4}$$
$$a31 + a32 + a33 = 0$$

Each output signal of matrix circuit 12 has eight bits and is applied to second nonlinear conversion circuit 13. Second conversion circuit 13 has a linear conversion characteristic for normal documents. Conversion circuit 13 also has a function to convert a too light document to a dark copy, and a dark document to a light copy.

An output signal of second conversion circuit 13 is applied to color conversion circuit 14. Conversion circuit 14 is formed of a ROM table and converts brightness and color difference signals, output from second conversion circuit 13, into ink-amount control signals representing the amounts of respective color inks (e.g., yellow Y, magenta M, cyan Cy, and black Bk) to be used in color printer 15.

Stored in the ROM table of conversion circuit 14 is data calculated in advance, in accordance with the known Neugebauer equation. Color printer 15 receives the ink-amount control signals and prints a color image of the document.

CPU 16 and clock generator 17 are provided to control and synchronize the operation of the respective circuits of the above color copier. Coupled to CPU 16 are nonvolatile RAM 18 for storing various data and ROM 19 for storing a program for controling the operations of the copier. Motor 20 moves a carrier (not shown) in the longitudinal direction (the subscanning direction) of the document, perpendicular to the line direction (the main scanning direction) of the document. The carrier carries a color scanner comprising light source 1, rod lens array 4, line-image sensor 5, analog switch 7, and A/D converter 8. Motor 20 receives a control signal from CPU 16 via interface 21.

The advantage of first nonlinear conversion circuit 11, provided in accordance with the present invention, will now be described.

Figure 4:
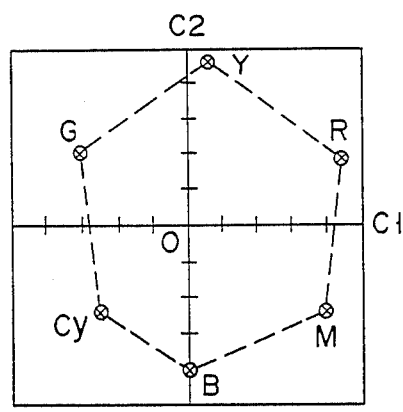
FIG. 4 shows a distribution of various colors on a color-difference signal plane in a color conversion circuit of FIG. 1, when a nonlinear conversion circuit having the characteristic shown in FIG. 3 is provided.
Figure 5:
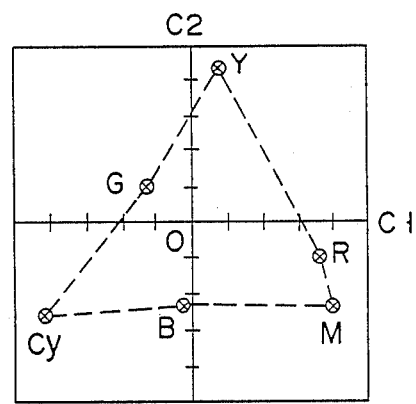
FIG. 5 shows a color-difference signal plane in the color conversion circuit, when a nonlinear conversion circuit having the characteristic shown in FIG. 3 is not provided.

FIG. 4 shows a color-difference signal plane obtained when the matrix conversion coefficients (a11 to a33) of matrix circuit 12 are properly determined such that coordinates representing each of colors Y, M, Cy, R, G, and B, resulting from conversion in first conversion circuit 11, are distributed at substantially the same distances from origin O on a plane defined by color-difference axes C1 and C2 in the ROM table of conversion circuit 14. FIG. 5 shows a similar color-difference signal plane obtained when first nonlinear conversion circuit 11 is not provided. In FIG. 4, the points of colors Y, M, Cy, R, G, and B constitute a hexagon, whereas in FIG. 5 the points of colors R, G, and B are located inside or close to a triangle formed of points of colors Y, M, and Cy.

As is apparent from FIG. 4, owing to provision of conversion circuit 11, R, G, and B are distributed at substantially equal distances from origin O, like Y, M, and Cy. As a result, the degrees (step size) of data quantization may be substantially uniform in the ROM table of color conversion circuit 14, thereby enabling any color to be reproduced faithfully by the color printer.

Conversely, when first conversion circuit 11 is not provided, R, G, and B are located closer to origin O than Y, M, and Cy, as is shown in FIG. 5. As a result, the levels of data quantization would become coarse. Thus, it becomes difficult to properly reproduce R, G, and B. In order to properly reproduce R, G, and B, data quantization must be fine, as a whole. For this purpose, color conversion circuit 14 must have a large memory capacity. As is shown in FIG. 5, R and M are close to each other, and it is, therefore, difficult to reproduce an intermediate color therebetween. A color of skins of people exists between R and M. Therefore, intermediate color between R and M must be faithfully reproduced. Since, according to the present invention, however, first nonlinear conversion circuit 11 is provided, such a problem is obviated.

Assuming that an adjustment angle of hue in matrix circuit 12 is $\theta$, matrix conversion is expressed as follows:

$$\begin{pmatrix} I \\ C1 \\ C2 \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} a\,11 & a\,12 & a\,13 \\ a\,21 & a\,22 & a\,23 \\ a\,31 & a\,32 & a\,33 \end{pmatrix} \begin{pmatrix} R \\ G \\ B \end{pmatrix} \quad (5)$$

Concerning the adjustment of a hue in accordance with a rotation in the C1-C2 plane of FIG. 4, it will be evident that, since each of Y, M, Cy, R, G, and B rotates through a similar extent irrespective of $\theta$, substantially no change occurs in its saturation. On the other hand, in the case of FIG. 5, when G is rotated toward Cy, it is changed to Cy which is low in saturation. Further, since R and M are close to each other, it is difficult to perform fine adjustment of an intermediate color therebetween.

In this manner, due to provision of first nonlinear conversion circuit 11 preceding matrix circuit 12, in accordance with the present invention, faithful reproduction of colors is made possible without increasing the memory capacity of color conversion circuit 14. Hue adjustment can be performed easily, as well.

The parameters of conversion circuit 11, particularly D, can take a value different from that of D used for forming the ROM table of color conversion circuit 14. In this case, the saturation of a dark color can be increased.

Figure 6:
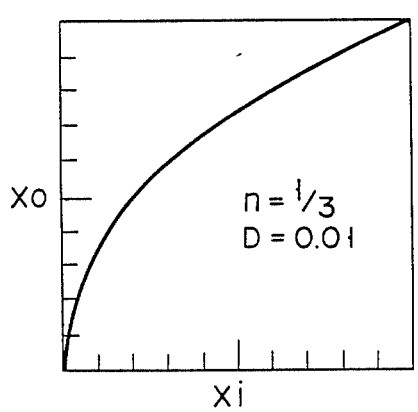
FIG. 6 shows another characteristic of the nonlinear conversion circuit.

This is based on the following reason:

When a dark color is to be reproduced, noises caused by a dark current in the color image sensor are no longer negligible. As a result, a reproduced dark color is apt to become impure, thereby decreasing the freshness of the color. In order to prevent this, the table of color conversion circuit 14 is formed while providing first nonlinear conversion circuit 11 with the input/output characteristic shown in FIG. 3, and in practical use, first conversion circuit 11 may be provided with the characteristic of $D = 0.01$ and $n = \frac{1}{3}$, as is shown in FIG. 6.

Figure 7:
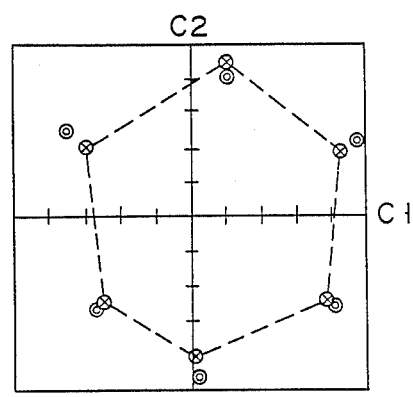
FIG. 7 shows a color-difference signal plane wherein a nonlinear conversion circuit having the characteristic shown in FIG. 6 is provided.
Figure 9:
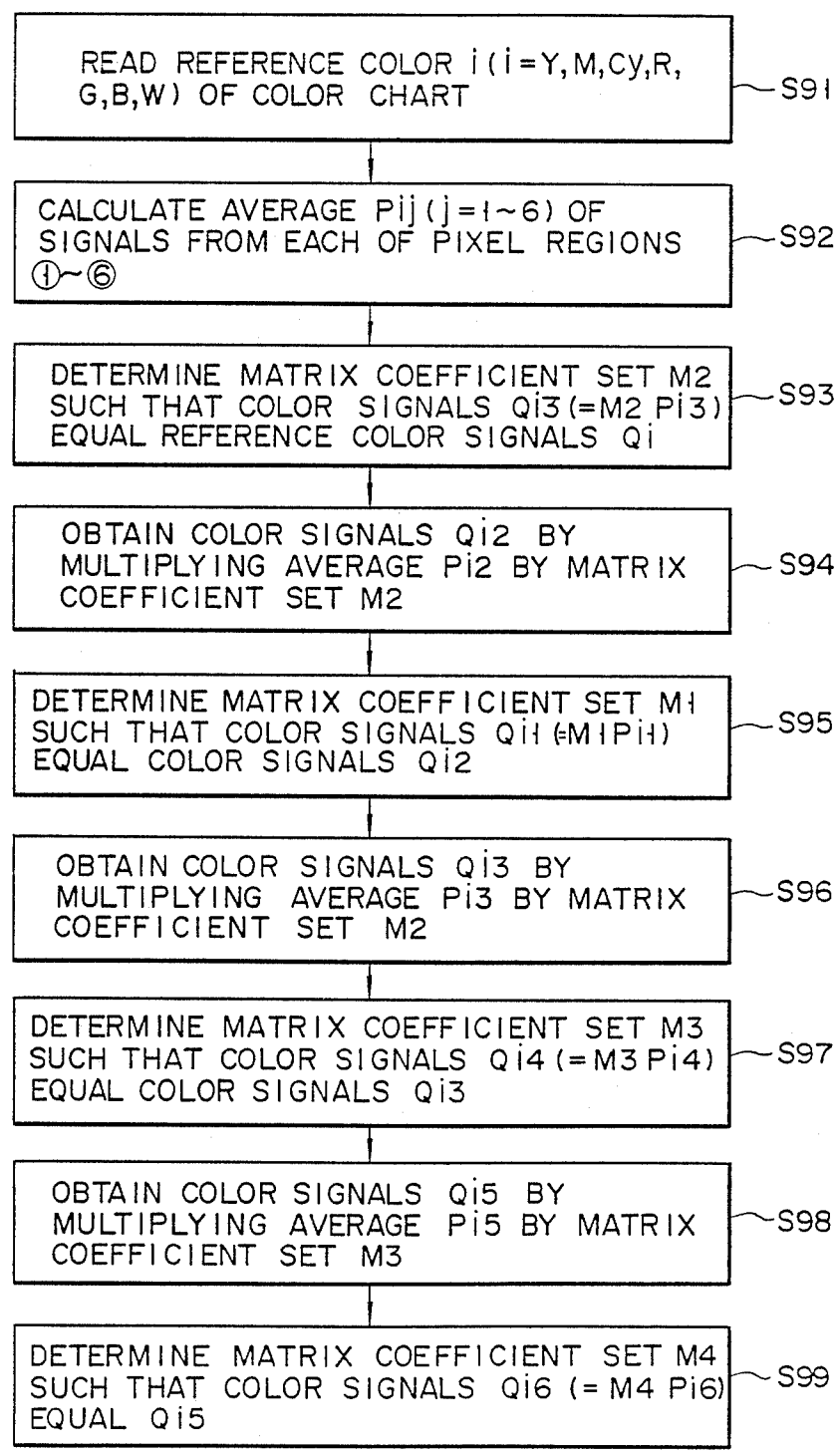
FIG. 9 is a flow chart for explaining a compensation procedure of the matrix conversion coefficients.

By so doing, Y, M, Cy, R, G, and B are moved to positions indicated by double circles on the color difference plane shown in FIG. 7. Namely, a relatively dark color, such as R, G, and B, moves in such a direction (far away from origin O) that the saturation becomes higher than when the ROM table of color conversion circuit 14 was formed. Therefore, a decrease in saturation of a dark color, which is caused by the characteristics of the color image sensor, can be compensated for.

According to another feature of the present invention, matrix circuit 12, which converts R, G, and B signals into brightness signal I and color-difference signals C1 and C2, has a function to compensate for the variation in color signals caused by the spectral characteristics of CCD chips 5a to 5d, so that colour variations at the boundaries of CCD chips 5a to 5d of color image sensor 5 may not be noticed. This function will now be described.

Reference color chart 3, having seven color patterns Y, M, Cy, R, G, B, and W (white) arranged in a stripe-like manner, is placed on glass plate 2 for color compensation. Each color pattern has a width corresponding to, for example, four lines. Chart 3 is scanned by a color scanner, in the same manner as a normal document, so that R, G, and B electrical signals are derived from image sensor 5.

FIG. 8A shows a mechanical arrangement of CCD chips 5a to 5d of line image sensor 5. FIG. 8B shows signal components which are derived from the respective chips when the pattern of yellow Y is scanned and correspond to the R color filter elements. As is shown in FIG. 8B, a difference in amplitude inevitably occurs between signals derived from CCD chips 5a to 5d, due to the variation in spectral characteristics of the color filter arrays. It will be understood that this causes a noticeable difference in color in a reproduced image, particularly at the boundaries of CCD chips 5a to 5b. In order to solve this problem, the matrix coefficients of matrix circuit 12 are compensated such that the signals derived from chips 5a to 5d become continuous at the boundaries thereof, as is shown in FIG. 8C. As a result, it is possible to visually suppress the color differences reproduced by respective chips 5a to 5d.

Prior to discussion of the method for compensating the matrix coefficients, with reference to FIGS. 8A to 8C and 9, the arrangement of matrix circuit 12 will be described with reference to FIG. 10.

Matrix circuit 12 comprises data RAM 91 for temporarily storing R, G, and B signals from first nonlinear conversion circuit 11. RAM 91 has a memory capacity capable of storing R, G, and B signals of one line. RAM 91 is accessed by CPU 16 via memory controller 92 which responds to a clock signal from clock generator 17, so that one-line image data is read into CPU 16. Nonvolatile RAM 93, for storing the matrix coefficients, is provided. RAM 93 has memory areas 93a to 93d for storing matrix coefficient sets M1 to M4 for the respective output signals of chips 5a to 5d. The matrix coefficient sets are loaded from CPU 16 via memory controller 92.

Matrix coefficients read from RAM 92 are applied to multiplier 94 where R, G, and B signals are multiplied by the matrix coefficients. In this case, the R, G, and B signals, for example, read out from CCD chip 5a are multiplied by matrix coefficients read out from memory area 93a of RAM 93. Similarly, R, G, and B electrical signals read out from CCD chips 5b, 5c, and 5d are multiplied by matrix coefficients stored in memory areas 93b, 93c, and 93d of RAM 93, respectively. The output of multiplier 94 is coupled to adder 95. The output of adder 95 is coupled to first-stage shift register 96 of cascade-connected shift registers 96, 97, and 98.

The output of last-stage register 98 is coupled to adder 95. Cascade-connected shift registers 96, 97, and 98 provide a delay time corresponding to a transmission time of R, G, and B signals for one pixel. As a result, the R, G, and B signals are matrix-converted, so that brightness signal I and color-difference signals C1 and C2, shown in equation (3), are derived from adder 95.

The method of compensating the matrix coefficients will now be described with reference to FIGS. 8A to 8C and 9.

Reference color i (i = Y, M, Cy, R, G, B, W) is read in step S91. As is shown in FIG. 1, reference color chart 3 having seven color patterns is placed on glass plate 2, and a color scanner scans chart 3, to obtain electrical signals corresponding to respective reference colors i. These electrical signals are read into CPU 16 via RAM 91 of matrix circuit 12. In this case, although each reference color pattern has a size corresponding to four lines, as mentioned above, it suffices that only one line data be read into CPU 16 for each reference color i.

As is shown in FIG. 8A, regions ①, ②, ③, ④, ⑤, and ⑥ and having predetermined numbers of pixels are set at the end portions of CCD chips 5a to 5d that are adjacent to the next CCD chips. Each of these regions is assigned with pixels whose number is a power of two, e.g., 64 pixels. CPU 16 temporarily stores the R, G, and B signals of these pixel regions ①, ②, ③, ④, ⑤, ⑥, in RAM 18.

In step S92, CPU 16 reads the R, G, and B signals of each pixel region from RAM 18, and averages each of these signals, thereby obtaining averages Pij of the R, G, B signals for each color chart. Pij (j=1 to 6) is a vector consisting of R, G, and B signal components. More specifically, Pij=(Prij, Pgij, Pbij), $$Prij = \sum_{k}^{64} Rijk/64, \quad Pgij = \sum_{k}^{64} Gijk/64, \text{ and } Pbij = \sum_{k}^{64} Bijk/64.$$

The averages are supplied from CPU 16 to RAM 18, to be temporarily stored therein.

In step S93, matrix coefficient set M2 (a 11'... a 33') is obtained such that color signals Qi3 (Ii3, Ci31, Ci32), which are obtained by multiplying averages Pi3 (Pri3, Pgi3, Pbi3) of the R, G, B signals from end pixel region ③ of chip 5b, which corresponds to the central portion of image sensor 5, by matrix coefficient set M2, substantially equal reference color signals Qi. As reference color signals Qi, use is made of data obtained when the ROM table of color conversion circuit 14 was formed, and the reference data has been in advance stored in ROM 19. CPU 16 reads signal averages Pij from non-volatile RAM 18 and reference color signals Qi from ROM 19, to determine matrix coefficient set M2.

By using a standard line image sensor, reference color signals Qi are given by $$Qi = MoPi \quad (6)$$

where Pi is the color signals read from the color line-image sensor and Mo is a set of standard matrix coefficients.

Average square error E of color signals Qi3 (=M2Pi3), which are obtained by multiplying averages Pi3 of the R, G, B signals from pixel region 3, and reference color signals Qi, is obtained as follows:

$$E = \sum_{i} (Wi|M2Pi3 - Qi|^2) \quad (7)$$

CPU 16 calculates matrix coefficient set M2, which minimizes error E, in accordance with the following known equation given by $$M2 = \left(\sum_{i} WiQiPi3^t\right)\left(\sum_{i} WiPi3Pi3^t\right)^{-1} \quad (8)$$

CPU 16 temporarily stores the thus-obtained matrix coefficient set M2, corresponding to chip 5b, in RAM 18.

In equations (7) and (8), Wi is a weighting coefficient of each reference color, e.g., W=2 for white and W=1 for the other colors. Symbol Σ represents a total sum of data with respect to seven reference colors. Symbol t stands for transposed vector.

Subsequently, matrix coefficient set M1 for the signals from chip 5a is determined in the following manner:

Matrix coefficient set M2 for the signals from chip 5b has already been determined as described above. Therefore, in step S94, CPU 16 converts averages Pi2 of the R, G, B signals from leftmost pixel region ② of chip 5b, using matrix coefficient set M2, thereby obtaining color signals Qi2 (=M2Pi2).

To decrease a difference in color between CCD chips 5a and 5b, color signals Qi1 (=M1Pi1) based on averages Pi1 of the signals from rightmost pixel region ① of chip 5a, should be coincident with Qi2. Therefore, in step S95, CPU 16 determines matrix coefficient set M1 in accordance with the following equation, in a similar manner as in step S93, so as to minimize average square error E:

$$M1 = \left(\sum_{i} WiQi2Pi1^t\right)\left(\sum_{i} WiPi1Pi1^t\right)^{-1} \quad (9)$$

Matrix coefficient set M1 (a 11 ... a 33), thus determined, is temporarily stored in RAM 18.

Similarly, in step S96, color signals Qi3 (=M2Pi3) are calculated on the basis of averages Pi3 of the R, G, B signals from pixel region ③. Then, in step S97, CPU 16 determines matrix coefficient set M3 for the signals from chip 5c, in accordance with the following equation:

$$M3 = \left(\sum_{i} WiQi3Pi4^t\right)\left(\sum_{i} WiPi3Pi4^t\right)^{-1} \quad (10)$$

$$Qi3 = M2Pi3$$

CPU 16 temporarily stores the thus-obtained matrix coefficient set M3 (a11"... a33"), for chip 5c, in RAM 18.

Subsequently, in step S98, CPU 16 calculates color signals Qi5 (=M3Pi5) by multiplying averages Pi5 of the signals from rightmost pixel region ⑤ of chip 5c, by matrix coefficient set M3. Then, in step S99, CPU 16 determines matrix coefficient set M4 for the signals from chip 5d, using averages Pi6 of the signals from leftmost pixel region ⑥ of chip 5d, in accordance with the following equation:

$$M4 = \left(\sum_i WiQi5Pi6^t\right)\left(\sum_i WiPi6Pi6^t\right)^{-1} \quad (11)$$

$$Qi5 = M3Pi5$$

CPU 16 temporarily stores the thus-obtained matrix coefficient set M4 (a11''. . . a33''), for the signals from chip 5d, in RAM 18.

Matrix coefficient sets M1 to M4 for chips 5a to 5d, that are obtained in the above manner, are respectively transferred from RAM 18 to memory areas 93a to 93d of RAM 93 of matrix circuit 12. This transfer may be automatically performed when the power source of the color copier is turned on. Alternatively, RAM 93 of matrix circuit 12 may be a nonvolatile RAM. The R, G, and B signals sequentially obtained from chips 5a to 5d are subjected to matrix conversion in matrix circuit 12, by corresponding matrix coefficient sets M1 to M4 read out from RAM 93. As a result, a difference in color at the boundaries of CCD chips is decreased, as is shown in FIG. 8C.

Matrix coefficient sets M1 to M4 calculated according to the present invention do not necessarily satisfy the condition indicated in equation (4).

In the above-described method for compensating the matrix coefficients, even if the error sum is minimized by using the minimum square error method shown in equation (8), a specific color may deviate from a corresponding specific hue. This problem can be solved if the matrix coefficients are compensated in the following manner.

After matrix coefficient set M is obtained in accordance with equation (8), error Eij of each color is calculated in accordance with the following equation:

$$Eij = |MPij - Qij|^2 \quad (12)$$

If error Eij exceeds a tolerance value, calculation is performed in accordance with equation (8), again using larger weighting coefficient Wi. By repeating this calculation, the deviation of each color can be suppressed within a tolerance range.

In the above embodiment, R, G, and B color filter arrays are used as color filters of a color image sensor. However, Y, G, and Cy, or Y, W, and Cy color filter arrays can be used instead.

What is claimed is:

1. A color copier comprising:
   a color line image sensor for optically scanning, line by line, a color document to provide fundamental color signals for each line of the document;
   matrix circuit means connected to receive the fundamental color signals for converting the fundamental color signals into a brightness signal and two color difference signals, said matrix circuit means having a set of matrix coefficients for obtaining the brightness signal and the two color difference signals;
   a color printer for reproducing the color document by use of a plurality of color inks;
   color conversion circuit means, coupled between said matrix circuit means and said color printer, including a read only memory table for storing ink amount control signals in a digitalized manner, which are adapted for controlling the amounts of the color inks used in said color printer, said read only memory table being accessed by the brightness signal and the color difference signals for outputting corresponding ink amount control signals; and
   nonlinear conversion circuit means connected between said image sensor and said matrix circuit means for converting the fundamental color signals from said image sensor in a nonlinear fashion such that a change in level of an input signal in a low-level range is increased to an extent greater that that in a high-level range, whereby the degrees of data quantization of the ink amount control signals are made substantially uniform in said read only memory table of said color conversion circuit means.

2. A copier according to claim 1, wherein
   said color line-image sensor is divided into a plurality of sensor sections along the line of the document; and
   said matrix circuit has a plurality of matrix conversion coefficient sets corresponding to said plurality of sensor sections of said color line-image sensor.

3. A copier according to claim 2, wherein said plurality of matrix conversion sets are determined such that a difference in color signals obtained from adjacent sensor sections can be minimized.

4. A copier according to claim 1, wherein said color line-image sensor comprises a charge-coupled device and a color filter array of fundamental colors.

5. A copier according to claim 4, wherein said color filter array comprises red, blue, and green filter elements arranged in a line.

6. A copier according to claim 1, wherein said nonlinear conversion circuit has a conversion characteristic given by $$Xo = \{(Xi+D)^n - D^n\}/\{(1+D)^n - D^n\}$$

where Xi and Xo are input and output signals of said nonlinear conversion circuit, respectively, and D and n are each a constant.

7. A copier according to claim 6, wherein D is about 0.05 and n is ranged from $\frac{1}{2}$ to $\frac{1}{3}$.

8. A copier accoridng to claim 2, wherein D=0.05 and n=$\frac{1}{3}$.

9. A copier according to claim 6, wherein D=0.01 and n=$\frac{1}{3}$.

10. A color copier comprising:
    a color line image sensor for optically scanning, line by line, a color document to provide fundamental color signals representative of red, green, and blue for each line of the document;
    matrix circuit means connected to receive the fundamental color signals for converting the fundamental color signals into a brightness signal I and two color difference signals C1 and C2, said matrix circuit means having a set of matrix coefficients for obtaining the brightness signal and the two color difference signals;
    a color printer for reproducing the color document by use of a plurality of color inks including magneta, yellow, and cyana;
    color conversion circuit means, coupled between said matrix circuit means and said color printer, including a read only memory table for storing ink amount control signals in a digitized manner, which are adapted for controlling the amounts of the color inks used in said color printer, said read only memory table being accessed by the brightness signal and the color difference signals for outputting corresponding ink amount control signals; and nonlinear conversion circuit means connected between said image sensor and said matrix circuit means for converting the fundamental color signals from said image sensor in a nonlinear fashion such that a change in level of an input signal in a low-level range is increased to an extent greater than that in a high-level range, whereby the coordinates representing each of yellow, magneta, cyan, red, green, and blue are distributed at substantially the same distance from the origin on a plane defined by color difference axes in said read only memory table of said color conversion circuit means.

* * * * *